(12) United States Patent
Garcia-Luna-Aceves et al.

(10) Patent No.: US 7,310,335 B1
(45) Date of Patent: Dec. 18, 2007

(54) MULTICAST ROUTING IN AD-HOC NETWORKS

(75) Inventors: Jose J. Garcia-Luna-Aceves, San Mateo, CA (US); Marcelo Spohn, Santa Cruz, CA (US)

(73) Assignee: Nokia Networks, Espoo (FI)

( * ) Notice: Subject to any disclaimer, the term of this patent is extended or adjusted under 35 U.S.C. 154(b) by 605 days.

(21) Appl. No.: 09/703,074

(22) Filed: Oct. 31, 2000

Related U.S. Application Data

(60) Provisional application No. 60/230,603, filed on Sep. 6, 2000.

(51) Int. Cl.
*H04L 12/44* (2006.01)

(52) U.S. Cl. ........................ 370/390; 370/432

(58) Field of Classification Search ........ 370/254–256, 370/351, 352, 353, 354, 355, 356, 390, 400, 370/401, 408, 432, 473, 389, 392; 709/220–223, 709/228, 252, 238
See application file for complete search history.

(56) References Cited

U.S. PATENT DOCUMENTS

| | | | |
|---|---|---|---|
| 4,466,060 A | | 8/1984 | Riddle |
| 4,864,559 A | * | 9/1989 | Perlman ...................... 370/60 |
| 5,265,092 A | * | 11/1993 | Soloway et al. ............. 370/60 |
| 5,289,460 A | * | 2/1994 | Drake, Jr. et al. ............ 370/17 |
| 5,331,637 A | * | 7/1994 | Francis et al. ................ 370/54 |
| 5,355,371 A | * | 10/1994 | Auerbach et al. ............. 370/60 |
| 5,517,494 A | * | 5/1996 | Green .......................... 370/60 |
| 5,946,316 A | * | 8/1999 | Chen et al. .................. 370/408 |
| 6,321,270 B1 | * | 11/2001 | Crawley ...................... 709/238 |
| 6,370,142 B1 | * | 4/2002 | Pitcher et al. ............... 370/390 |
| 6,415,312 B1 | * | 7/2002 | Boivie ......................... 709/200 |
| 6,778,532 B1 | * | 8/2004 | Akahane et al. ............. 370/392 |
| 6,795,433 B1 | * | 9/2004 | Li ................................ 370/392 |

FOREIGN PATENT DOCUMENTS

| | | |
|---|---|---|
| EP | 0854618 A | 7/1998 |
| EP | 0854618 A2 | 7/1998 |
| EP | 0967753 A2 | 12/1999 |
| WO | WO 00/39967 A2 | 7/2000 |
| WO | WO 01/028170 A3 | 4/2001 |

OTHER PUBLICATIONS

Garcia-Luna-Aceves J J et al "A multicast routing protocol for ad-hoc networks" Mar. 21, 1999 pp. 784-792.
Garcia-Luna-Aceves J J et al "Source-tree routing.in.wireless.networks" Conference Proceedings Article, 1999 p. 275.

(Continued)

*Primary Examiner*—Wing Chan
*Assistant Examiner*—Duc Duong
(74) *Attorney, Agent, or Firm*—Squire, Sanders & Dempsey, LLP

(57) ABSTRACT

Multicast routing in ad-hoc networks by exchange of multicast group update information and routing tree information among neighboring routers is disclosed. A router propagates multicast group update information based on the update information and the routing tree information. A router also determines whether to forward multicast data packets based on control information in the multicast data packets and the routing tree information.

32 Claims, 1 Drawing Sheet

OTHER PUBLICATIONS

Garcia-Luna_Aceves J.J. et al. "A Multicast Routing Protocol for Ad-hoc Networks," Mar. 21, 1999, pp. 784-792.

Garcia-Luna_Aceves J.J. et al. "Source-Tree Routing in Wireless Networks," 1999, pp. 275-284.

PCT Notification of Transmittal of The International Search Report or The Declaration for PCT Counterpart Application No. PCT/US01/27348 Containing International Search Report (Aug. 12, 2002).

Patent Cooperation Treaty's Written Opinion for International application No. PCT/US01/27348, dated Oct. 28, 2002, 5 pgs.

J.J. Garcia-Luna-Aceves and M. Spohn, "Source-Tree Routing in Wireless Networks," Conference Proceedings Article, XP010356984, pp. 273-282 (1999).

J.J. Garcia-Luna-Aceves and Ewerton L. Madruga, "A Multicast Routing Protocol for Ad-Hoc Networks," Infocom '99, 18th Annual Joint Conference of the IEEE Computer and Communications Societies, Proceedings, XP010323814, pp. 784-792 (Mar. 21, 1999).

J.J. Garcia-Luna-Aceves and E.L. Madruga, "The Core Assisted Mesh Protocol," IEEE Journal on Selected Areas in Communications, Special Issue on Ad-Hoc Networks, vol. 17, No. 8, pp. 1380-1394 (Aug. 1999).

S. Murthy and J.J. Garcia-Luna-Aceves, "An Efficient Routing Protocol for Wireless Networks," Baltzer Journals, pp. 1-27 (1996).

P.A. Humblet, "Another Adaptive Shortest-Path Algorithm," LIDS-P1775, pp. 1-24 (May 1990).

C. Cheng, R. Reley, S.P.R. Kumar, and J.J. Garcia-Luna-Aceves, "A Loop-Free Extended Bellman-Ford Routing Protocol without Bouncing Effect," Proc. ACM SIGCOMM '89, pp. 224-236 (Sep. 1989).

B. Rajagopalan and M. Faiman, "A Responsive Distributed Shortest-Path Routing Algorithm within Autonomous Systems," Journal of Internetworking: Research and Experience, vol. 2, No. 1, pp. 51-69 (Mar. 1991).

S. Deering, "Host Extensions for IP Multicasting," In the Internet Engineering Task Form (IETF) Request for Comments—1112, Aug. 1989.

* cited by examiner

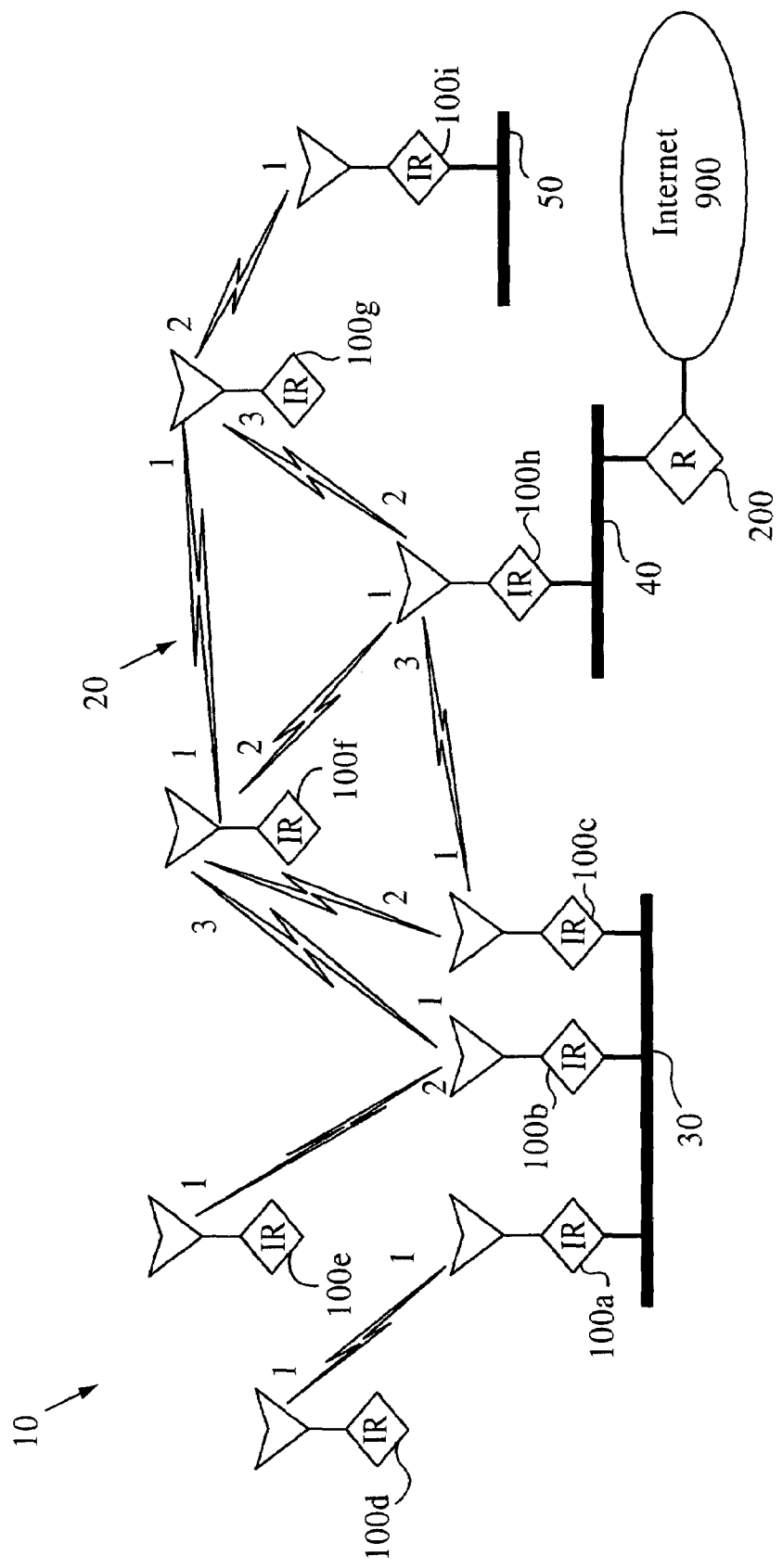

MULTICAST ROUTING IN AD-HOC NETWORKS

This application claims the benefit of U.S. Provisional Application No. 60/230,603, filed Sep. 6, 2000

FIELD OF THE INVENTION

The present invention relates to the transmission of packets to multiple destinations in ad hoc networks in which both routers and hosts may be mobile and in which routers can have both hosts and networks attached to them.

BACKGROUND

Multi-hop packet-radio networks, or ad hoc networks, consist of mobile hosts interconnected by routers that can also move. The deployment of such routers is ad hoc and the topology of the network is very dynamic, because of host and router mobility, signal loss and interference, and power outages. In addition, the channel bandwidth available in ad hoc networks is relatively limited compared to wired networks, and untethered routers may need to operate with battery-life constraints. In these networks, routing must be accomplished using the minimum number of control messages possible, and avoiding neighbor-to-neighbor handshakes as much as possible, in order to preserve channel bandwidth for user data and the battery life of untethered nodes. Because of the dynamics of the topology in an ad hoc network, broadcast radio links are preferable for interconnecting routers without the need for topology planning.

With few exceptions, the methods used today for supporting many-to-many communication (multicasting) efficiently in computer networks involve establishing multicast routing trees. The basic approach consists of establishing a routing tree for a group of routing nodes (routers). Once a routing tree is established for a group of routers, a packet or message sent to all the routers in the tree traverses each router and link in the tree only once.

The multicast routing protocols developed for the Internet to date fall in two basic categories, which were first described in "Host Extensions for IP Multicasting" In the Internet Engineering Task Force (IETF) Request For Comments-112, August 1989 by S. Deering: protocols based on complete topology information, which are also called link-state multicasting protocols, and protocols based on distance information. Multicast OSPF (MOSPF) is an example of the topology-based approach. In MOSPF, each router communicates to every other router in the network the multicast groups to which a given link belongs in addition to the link characteristics used in the Open Shortest Path First (OSPF) protocol. With this information, each router can compute the shortest-path multicast routing tree from each source of a given multicast routing group to the rest of the routers that have reported a link that belongs to the multicast group. The limitations with this approach are the traffic overhead incurred in disseminating changes in group membership information for each link in the network, and the processing overhead incurred in computing the shortest-path trees from each source of a multicast group to the rest of the group members.

Examples of protocols based on distance information are the Distance Vector Multicast Routing Protocol (DVMRP), the Core Based Tree (CBT) protocol, the Ordered Core Based Tree (OCBT) protocol, the Protocol Independent Multicast (PIM) protocol. All these protocols are based on the notion of reverse path forwarding. In DVMRP, the source of a multicast group floods the entire network with a multicast packet; each router receiving the packet forwards it to all its other interfaces if the packet is received from the neighbor that its unicast routing table lists as its next hop to the source of the packet. For a given multicast group, routers that do not have group members on any of their attached networks send a prune control packet to the neighbor listed in its routing table as its next hop to the source of the multicast group. The key limitation of DVMRP is the need to flood the entire network with multicast packets before routers with no multicast members attached to them can prune the resulting spanning tree.

CBT eliminates the need to flood and prune the network by using a special router, which is called the core, as the point of reference for routers to join a given multicast group. Routers with interfaces to networks in which there is one or more hosts requiring to join a multicast group send a join request to the designated core of that multicast group along their shortest paths to the core. Any router that is already part of the multicast routing tree of the group and receives such a join request sends back an acknowledgment to the router that sent the request; accordingly, new multicast tree branches are established along shortest paths from receivers to the core of the multicast group. In contrast to DVMRP, there is only one multicast routing tree per multicast group in CBT. The shared tree built for a given multicast group is bi-directional, which implies that multicast packets can flow in both directions of a link connecting two routers in the multicast tree.

PIM has two modes of operation, dense mode and sparse mode. In PIM dense mode (PIM-DM), the flood and prune approach used in DVMRP is used, with the only difference that PIM-DM relies on the unicast routing tables available at routers, rather than requiring routers to maintain separate routing tables with distances to multicast sources as DVMRP does. PIM sparse mode (PIM-SM) uses the same strategy introduced in CBT to build shared trees; however, the shared trees built with PIM-SM are unidirectional, and the direction of the links in the multicast tree is away from the root of the multicast tree, called the rendezvous point (RP). Accordingly, sources send their packets to the RP and then they are distributed over the multicast tree to all the receivers.

Multicast routing trees have also been proposed for wireless multi-hop networks. These approaches establish multicast routing trees by means of flooding of control packets that search for members of the multicast group.

Because a multicast tree provides a single path between any two routers in the tree, the minimum number of copies per packet are used to disseminate packets to all the receivers of a multicast group. For a tree of N routers, only N-1 links are used to transmit the same information to all the routers in the multicast tree in a network with point-to-point links; in the case of wireless networks with broadcast links using a single channel, each member of a multicast tree needs to transmit a packet only once. Using routing trees is of course far more efficient than the brute-force approach of sending the same information from the source individually to each of the other N-1 times. An additional benefit of using trees for multicast routing is that the routing decisions at each router in the multicast tree becomes very simple: a router in a multicast tree that receives a multicast packet for the group over an in-tree interface forwards the packet over the rest of its in-tree interfaces.

However, multicast trees achieve the efficiency and simplicity described above by forcing a single path between any pair of routers. Accordingly, if multiple sources must transmit information to the same set of destinations, using routing trees requires that either a shared multicast tree be used for all sources, or that a separate multicast tree be established for each source. Using a shared multicast tree has the disadvantage that packets are distributed to the multicast group along paths that can be much longer than the shortest paths from sources to receivers. Using a separate multicast tree for each source of each multicast group forces the routers that participate in multiple multicast groups to maintain an entry for each source in each multicast group, which does not scale as the number of groups and sources per group increases. In addition, because trees provide minimal connectivity among the members of a multicast group, the failure of any link in the tree partitions the group and requires the routers involved to reconfigure the tree.

Although tree-based multicast routing is very attractive for wired networks and the Internet because of its simplicity, maintaining a multicast routing when the underlying topology changes frequently incurs an undesirable amount of control traffic. Furthermore, during periods of routing-table instability, routers may be forced to stop forwarding packets while they wait for the multicast routing tree to be reconstructed.

Recently, two approaches have been proposed for the establishment of multicast meshes, rather than multicast trees. A multicast mesh is a connected subset of a network that includes all the members of a given multicast group and that provides at least one path from each source to each receiver in the multicast group.

The Core Assisted Mesh Protocol (CAMP), proposed by Garcia-Luna-Aceves and Madruga J. J. Garcia-Luna-Aceves and E. L. Madruga in "The Core Assisted Mesh Protocol", *IEEE Journal on Selected Areas in Communications*, Special Issue on Ad-Hoc Networks, Vol. 17, No. 8, pp. 1380-1394, August 1999, extends the basic receiver-initiated approach introduced in the core-based tree (CBT) protocol for the creation of multicast trees to enable the creation of multicast meshes. Cores are used to limit the control traffic needed for receivers to join multicast groups. In contrast to CBT, one or multiple cores can be defined for each mesh, cores need not be part of the mesh of their group, and routers can join a group even if all associated cores become unreachable. A router sends a join request towards a core if none of its neighbors are members of the group; otherwise it simply announces its membership using either reliable or persistent updates. If cores are not reachable from a router that needs to join a group, the router broadcasts its join request using an expanding ring search (ERS) that eventually reaches some group member. When one or multiple responses are sent back to the router, it chooses any of these responses to use as a path to the mesh.

The Forwarding Group Multicast Protocol (FGMP) and the On-demand Multicast Routing Protocol (ODMRP) also build a variation of meshes. However, to establish group meshes, FGMP and ODMRP require for control packets to be flooded in an ad hoc network in much the same was as DVMRP and PIM-DM require multicast data packets to be flooded first. The difference between these two protocols lies in who starts the flooding process—in the former, the receivers, and in the latter, the senders. This approach is acceptable only in small networks. In contrast, the use of cores in CAMP eliminates the need for flooding, unless all cores are unreachable from a connected component.

In essence, ODMRP requires that all senders that are active transmitting data packets periodically flood the network with a sender-advertising packet. All routers directly connected to hosts willing to participate in the multicast group will process those advertising packets, and update a member table. This table lists all senders whose advertisements were received and the neighbor routers used as next hop toward those senders. Periodically the member table is also broadcast, and intermediate routers listed in member tables as next hop to a sender will set a data forwarding flag, become group members and keep/broadcast a member table themselves. Just like CAMP, ODMRP keeps a data packet cache. Data packets are forwarded if the forwarding flag is set and the data packet is not already in the packet cache. FGMP is very similar to that approach, except for the fact mentioned above that receivers are the entities that flood membership advertisement packets, and senders keep track of receivers in the member table.

Both ODMRP and FGMP have scalability problems because of the design decision to flood control packets, and specially FGMP due to the fact senders have to keep track of all receivers in a multicast group.

A limitation of CAMP is the need to define a subset of routers as the cores serving a particular group, because this requires the cores to be configured as such by a system administrator. Furthermore, in the event that the cores of a multicast group are not reachable or fail, routers must rely on flooding the network with search messages to join the intended multicast group.

All of the multicast routing protocols in the prior art assume that either: complete topology information is available at each router (e.g., MOSPF), or distance information to destinations is available (e.g., CBT, CAMP, PIM-SM), or that the multicast routing tree can be built by flooding and then pruning (e.g., DVMRP, FGMP, ODMRP), or that flooding of search messages can be used to join multicast groups (e.g., AODV and multicast routing protocols based on on-demand routing).

A number of unicast routing protocols in the prior art are based on what we call the source-tree routing approach. In this approach routers communicate either the state (i.e., cost or length) of the links in a shortest-path routing tree, or the distance from the root of the tree and the second-to-last hop in the routing tree for each node in the tree. The first of this type of protocols was proposed in the U.S. Pat. No. 4,466, 060 by Riddle. In Riddle's protocol, a router communicates different shortest-path trees to different neighbors; such trees are called "exclusionary trees" by Riddle and specify the preferred paths to destinations excluding those paths that involve the router to which the update is being sent. An update packet or message specifies an entire exclusionary tree. The second protocol based on the source-tree routing approach was reported by Garcia-Luna-Aceves, in "A Fail Safe Routing Algorithm for Multihop Pocket-Radio Networks", Proc. IEEE Infocom 86, Miami, Fla., April 1986, which differs from Riddle's protocol in that the same shortest-path routing tree is sent incrementally by a router to all its neighbors. Humblet "Another Adaptive Shortest-Path Algorithm," IEEE Trans. Comm., Vol. 39, No. 6, June 1991, pp. 995-1003, Cheng et al "A Loop-Free Extended Bellman-Ford Routing Protocol without Bouncing Effect", Proc. ACM SIGCOMM 89, pp. 224-236, Rajagopalan and Faiman "A Responsive Distributed Shortest-Path Routing Algorithm within Autonomous Systems," Journal of internetworking: Research and Experience, Vol. 2, No. 1, March 1991, pp. 51-69, and Murthy and Garcia-Luna-Aceves "An Efficient Routing Protocol for Wireless Networks," ACM Mobile Networks and Applications Journal, Special issue on Routing in Mobile Communication Networks, 1996, have all proposed protocols based on source routing trees in which a router communicates to its neighbors the same shortest-path routing tree incrementally and differ from the protocol by Garcia-Luna-Aceves in the way in which a router obtains its own shortest-path routing tree from the trees reported by its neighbors.

Surprisingly, no multicast routing protocol proposed or implemented to date has taken advantage of the shortest-path routing trees that the aforementioned unicast routing protocols provide. Furthermore, none of the multicast protocols in the prior art prevents flooding of either control or multicast data packets without the use of special routers (cores or rendezvous points).

The Adaptive Internet Routing (AIR) protocol, disclosed in commonly assigned patent application Ser. No. 09/221,228, filed Dec. 23, 1998, is also based on the source routing-tree approach. It enables the dissemination of link-state information and node-state information in the form of labeled routing trees (LRTs). With AIR, a router sends updates to its neighbors regarding the links and nodes in its preferred paths to destinations. The links and nodes along the preferred paths from a source to each desired destination constitute an LRT that implicitly specifies the complete paths from the source to each destination and the characteristics of each link and node used in such paths. The aggregation of adjacent links and routing trees reported by neighbors constitutes the partial topology known by a router. The present invention makes use of AIR to enable multicast routing in ad hoc networks with no need for flooding of control or multicast data packets, or the assignment of special routers (e.g., cores) to each multicast group.

SUMMARY OF THE INVENTION

The present invention consists of a method for the establishment and maintenance of multicast meshes in ad hoc networks. The method disclosed herein relies on extending a unicast routing protocol based on the exchange of routing trees among neighbor routers with a labeling mechanism used to propagate multicast group membership information without requiring flooding of control or data packets to either find the multicast routing tree of a group or reach all the receivers of a multicast group. Because the routing trees used in the present invention are rooted at the routers communicating them, we call such trees source trees. Furthermore, we refer to the present invention as the Multicasting Over Source Trees (MOST) protocol.

In one preferred embodiment of the present invention, the Adaptive Internet Routing (AIR) Protocol disclosed in "A Unified Routing Scheme for Ad-Hoc Internetworking", commonly assigned patent application Ser. No. 09/221,228 filed Dec. 23, 1998, and incorporated by reference herein, is used as an integral part of MOST for the distribution of information regarding the state of every link and router in the preferred paths from the router to the known destinations of the network. In AIR, the source tree of a router specifies, for each node in the source tree, the address of the head of the link incident to the node, the state parameters of the link, and the state parameters of the node. In MOST, the information for each node of the source tree of a router is augmented to include multicast group membership information for the node. Each group membership consists of the address of a multicast group in which the router needs to participate because it has at least one interface with a host requiring membership in the multicast group.

The two main components of MOST are the method used to propagate information regarding the multicast groups to which routers belong, and the method used to forward multicast data packets in an ad hoc network.

A router using MOST knows the link state of each outgoing link adjacent to it by means of an underlying link-level service, and receives the incremental updates of its neighbors' source trees. These updates specify the state of the links and nodes that form part of a neighbor's source trees. Based on this partial-topology information, a router chooses its own preferred paths for unicast routing, and therefore obtains its own source tree, using a local path-selection algorithm.

In MOST, a router communicates to all its neighbors all its multicast group memberships. To join a multicast group in an ad hoc network, a router simply announces its membership in the group to its immediate neighbors.

A router leaves the group simply by announcing that it is no longer a member of the group to its immediate neighbors. A novel and simple mechanism is used in MOST to avoid flooding group membership information as it is done in MOSPF. A router forwards group membership updates only when the source-tree information available at the router indicate that at least one of its neighbors must receive the group membership update to keep all group members in the ad hoc network connected. Accordingly, only the first few routers announcing membership in a new multicast group have their group membership updates propagated to all other routers as part of routing table updates.

In MOST, a router can decide whether or not to forward a multicast data packet it receives using a forwarding method that is much less computationally-intensive than the method used in the link-state multicast approach adopted in MOSPF. In MOSPF, a router uses Dijkstra's shortest-path algorithm locally to compute the multicast routing tree from the source of a multicast packet to all the known receivers of the intended multicast group. Accordingly, although a router knows when to forward a multicast data packet because it computes locally the multicast routing tree from each source of the multicast group, this method incurs too much overhead as the network becomes large, and the number of groups and sources per group increase. In contrast, a router using MOST forwards a multicast data packet when (a) the packet is received from the neighbor that is the next hop in the shortest path to the source of the multicast packet, and (b) the source tree reported by the neighbor forwarding the packet has the router in a subtree with at least one router having reported being a member of the intended multicast group.

BRIEF DESCRIPTION OF THE DRAWINGS

The above set forth and other features of the invention are made more apparent in the ensuing detailed description of the invention when read in conjunction with the drawings wherein:

FIG. 1 illustrates an Ad-Hoc network according to an embodiment of the invention.

DETAILED DESCRIPTION

A method for multicast routing in ad hoc networks is disclosed herein. Although disclosed with reference to a specific unicast routing protocol and certain illustrated embodiments, the following description of embodiments of MOST should be regarded as exemplary only and should not be deemed to be limiting in scope. Those skilled in the art will recognize that the present invention may be implemented in a variety of ways and be applied in a variety of systems.

I. Basic Service and Architecture

The present invention is well suited for an ad hoc network that provides a seamless extension of the IP Internet to the ad hoc wireless environment. MOST will be described in terms of its operation in internet radios or IRs, which are wireless routers. However, it will be evident to those skilled in the art that MOST applies to computer networks an internetworks that need not be based on wireless links for router interconnection.

FIG. 1 illustrates aspects on an exemplary ad hoc network that will assist in the understanding of the remaining discussion. The ad hoc network depicted in the figure consists of a number of subnetworks 20, 30, 40, 50, which provide an extension of the Internet through a number of internet radios (IRs) 100a-100i. Each IR 100a-100i is a wireless router with an IP address and a MAC address. The ad hoc network 10 attaches to the Internet 900 via an access point, called "AirHead", which includes IR 100h interconnected to an Internet router 200 through local area network 40. In general, IRs 100a-100i operate over one or a multiplicity of radio channels, 1-3, using spread-spectrum wireless communication techniques common in the art. For example, the IRs 100a-100i may operate in one of the unregulated UHF frequency bands, thereby obviating the need for operating licenses. Router 200 may be operated by an Internet Service Provider (ISP). As shown, a single ISP may operate a LAN 40 to which an IR is connected. In such a scheme, IR 100h acts as an "AirHead" providing gateway service to Internet 900. Some may be associated with hosts, which can be accessed by any Internet user through ad hoc network 10. Like any router, each IR 100a-100i processes all messages, changes in the cost of an adjacent link, adjacent-link failures, and new-neighbor notifications one at a time and in the order in which it detects them.

Any IR 100a-100i in FIG. 1 can consider another IR to be adjacent (we call such an IR a "neighbor") if there is radio connectivity between the two IRs and one IR, e.g., IR 100a, can receive and acknowledge packets from the other IR, e.g., IR 100d. Accordingly, a physical broadcast link connecting multiple IRs is mapped into multiple point-to-point bi-directional links defined for the same IRs. Each pair of adjacent IRs defines two point-to-point bi-directional links between them, one in each direction. Each point-to-point bi-directional link has a head node of the link and a tail node of the link.

The description of the present invention assumes that the multicast data or control packets transmitted by an IR are heard by all the neighbors of the IR.

The present invention can be brought to practice together with any channel access protocol. However, details of particular embodiments are provided for the case in which the channel access protocol supports collision-free broadcasts from an IR to all of its neighbor IRs even in the presence of hidden IRs, and an underlying protocol, which we call the neighbor protocol, assures that each IR 100a-100i detects within a finite time the existence of a new neighbor IR and the loss of connectivity with a neighbor IR. The channel access protocol disclosed in commonly assigned U.S. patent application Ser. Nos. 09/418,899 filed on Oct. 15, 1999 and No. 09/248,738 filed Feb. 10, 1999, which are herein incorporated by reference, are examples of embodiments with which the present invention can be brought to practice. The neighbor protocol assumed in the present invention can be brought to practice using link-layer retransmission strategies common in the art.

MOST adopts the same basic architecture used in IP multicast. A mapping service is assumed to exist that provides IRs of the ad hoc network with the addresses of groups identified by their domain names. In the Internet, this service would be provided by the Domain Name System (DNS), for example. Hosts wishing to join a multicast group must first query the mapping service to obtain a group address and then interact with their local IR through a host-to-IR protocol to request membership in a multicast group. An example of such a host-to-IR protocol is the Internet Group Management Protocol (IGMP) in IP version 4

In addition to the naming service used by hosts to obtain multicast group addresses, MOST assumes the availability of source-tree information from a unicast routing protocol. As we have stated previously, in one preferred embodiment of the present invention, the Adaptive Internet Routing (AIR) Protocol is used as an integral part of MOST for the distribution of information regarding the state of every link and IR in the preferred paths from the IR to the known destinations of the ad hoc network. AIR is disclosed in "A Unified Routing Scheme for Ad-Hoc Internetworking", commonly assigned patent application Ser. No. 09/221,228 filed Dec. 23, 1998, assigned to the assignee of the present invention and incorporated herein by reference.

In AIR, the source tree of an IR specifies, for each node in the source tree, the address of the head of the link incident to the node, the state parameters of the link, and the state parameters of the node.

The basic service provided by MOST is the maintenance of multicast group membership information in a distributed manner and enabling the forwarding of data packets based on such information and the source-tree information provided by the unicast routing protocol used as an integral part of MOST. Multicast data packets are forwarded based on the reverse path forwarding scheme first introduced by Dalal, with which an IR forwards a multicast data packet only if it is received from a neighbor IR that is the successor to the source of the packet according to the unicast routing table maintained by the IR.

II. Information Exchanged and Maintained in MOST

IRs communicate updates to their group memberships using multicast state updates (MSU). In one preferred embodiment of the present invention, MSUs are exchanged independently from the updates sent as part of the unicast routing protocol used in the ad hoc network. In this case, an MSU consists of the following elements:

a) The network address of the IR that originated the MSU b) A time stamp that validates the MSU c) The identifier of a multicast group (e.g., the multicast address of the group)

d) A membership flag set to 1 if the IR becomes or continues to be a member of the multicast group, or 0 if the IR stops being a member of the multicast group.

In another preferred embodiment of the present invention, MSUs are sent as part of the update messages sent by the AIR protocol. In this case, an MSU consists of the list of group membership tuples included as a state parameter of the tail of a link reported in a routing state update (RSU) in AIR.

Each IR participating in MOST maintains the following information as part of the unicast routing protocol used together with MOST:

1. A unicast routing table (URT): At IR i, the RT made available to MOST specifies, for each destination j, the successor and the distance to the destination.

2. A topology graph (TG): The TG is built with the source tree (ST) reported by each neighbor IR and information about outgoing adjacent links.

3. A source tree (ST) obtained from the TG running a local path selection algorithm such as Dijkstra's shortest-path first algorithm.

The record entry for the link from u to v in the TG of IR i consists of the tuple (u, v, ts, {rn}, {l}, {n}), where u and v are the network addresses of the head and tail of the link, respectively, ts is the most recent time stamp received for link (u, v), {rn} is the list of neighbor IRs that have reported the link, {l} is a sequence of type-value pairs specifying link parameters, and {n} is a sequence of type-value pairs specifying node parameters.

The only requirement imposed on the local path-selection algorithm in this invention is that a node must produce source trees in computing its unicast successors to destinations. For example, this implies that, if IR A of IRs 100a-100i chooses IR B of IRs 100c-100i as its successor for destination D, it also chooses IR B for each intermediate IR in the preferred path from IR A to destination D. All IRs use the same cost metrics to compute their source trees, and also use the same tie-braking rules to choose a successor to a destination.

The cost of a failed link is considered to be infinity for any type of routing. The way in which costs are assigned to links or the specific types of parameters assigned to links and nodes for unicast routing is beyond the scope of this specification.

In addition to the aforementioned information obtained from the unicast routing protocol used together with MOST, the present invention requires each IR to maintain membership information for every IR in the ad hoc network.

The group membership information that an IR maintains for itself is stored in a group membership table (GMT). The GMT of an IR contains zero or more entries, and each entry specifies the following information:

(a) The identifier of a multicast group to which the IR belongs (b) The most recent time stamp used by the IR to notify its change of affiliation to the group.

The group membership information that an IR X of IRs 100a-100i maintains for any other IR in the ad hoc network consists of a GMT with zero or more entries, each such entry consisting of the following information:

(c) The identifier of a multicast group to which the IR belongs (d) The most recent time stamp used by the IR to notify its change of affiliation to the group.

IR X assigns a default value of 0 to the time stamp associated with a non-existing entry for a multicast group membership in the GMT associated with a neighbor IR or a remote IR.

Because the unicast routing protocol used together with MOST requires using a topology graph containing all the reachable nodes in the ad hoc network, an IR can maintain the group membership table (GMT) of other IRS as an integral part of its TG, and the GMT then becomes another node parameter in the TG.

The group membership table maintained at IR X for an adjacent or remote IR Y specifies the addresses of the multicast groups to which IR Y is known to belong and the most recent time stamp value heard in an MSU originated by IR Y.

III. Disseminating Group Membership Information

MOST uses a receiver-initiated method for IRs to join multicast groups that is far simpler than the schemes proposed to date that do not rely on complete topology information. A host first determines the address of the group it needs to join as a receiver. The host then uses that address to ask its attached IR to join the multicast group. The mechanisms used by the host to find the address of the intended multicast group and to interact with its attached IR are outside the scope of the present invention.

In one embodiment of the present invention, upon receiving a host request to join a group, the IR determines if it has announced its membership in the multicast group already by looking up its own group membership table (GMT). If no entry is found in the GMT, the IR sends an MSU to its neighbors; the MSU specifies a membership flag set to 1 for the multicast group to indicate that the IR is now becoming a member of the group. Similarly, when no attached host requires to be a member of a multicast group in which the IR has announced its affiliation, the IR issues an MSU with a membership flag reset to 0 to indicate that the IR is no longer a member of the multicast group.

In turn, if IR X of IRs 100a-100l receives an MSU from neighbor IR Y and the MSU has a membership flag set to 1, then IR X forwards the MSU to its own neighbors by re-transmitting the MSU if the following conditions are satisfied:

a) The MSU is valid.

b) IR X is not a member of the same multicast group specified in the tuple of the MSU forwarded by neighbor IR Y.

c) The source tree reported by neighbor IR Y has IR X as the root of a subtree such that (1) The subtree excludes IR Y (2) At least one neighbor of IR X in the subtree is not a member of the multicast group reported in the MSU.

If IR X receives an MSU from neighbor IR Y and the MSU has a membership flag set to 0, then IR X forwards the MSU to its own neighbors by re-transmitting the MSU if the following conditions are satisfied:

a) The MSU is valid.

b) IR X is a member of the same multicast group specified in the tuple of the MSU forwarded by neighbor IR Y.

c) The source tree reported by neighbor IR Y has IR X as the root of a subtree such that (1) The subtree excludes IR Y
(2) At least one neighbor of IR X in the subtree is a member of the multicast group reported in the MSU.

IR X determines that an MSU originated by IR Y is valid if the time stamp in the MSU is more recent than the time stamp value that IR X has for the group specified in the MSU and the IR that originated the MSU.

The following pseudocode illustrates an exemplary embodiment of the method with which an IR decides whether or not to forward MSUs received from their neighbors.

---

Procedure Process_MSU
SIR: node identifier of IR from which MSU is received
SNS: self neighbor set used in procedure
MSU: MSU received from neighbor IR -continued

```
MSU.ts:         Time stamp in MSU
MSU.group:      Multicast group announced in MSU
MSU.source:     IR originating the MSU
MSU.flag:       Membership flag in MSU
ST(x):          source tree reported by neighbor IR x
GMT(x):         GMT maintained for IR x
GMT(x).ts:      Time stamp in GMT for IR x
self:           IR executing the procedure
1.  if ( MSU.ts < GMT(SOURCE).ts or
        (MSU.ts > GMT(MSU.source).ts and MSU.source = self) )
        then call Procedure Correct_MSU(MSU.source, MSU.group,
        MSU.ts)
2.  if (MSU.flag =1)
        2.1. then begin
            i.   if ( self in MSU.group ) then return
            ii.  set SNS = empty set
            iii. for each neighbor n of self
                    do begin
                        if ( link (self, n) in ST(SIR) ) then set SNS =
                            SNS U n
                    end
            iv.  get a node p in SNS
            v.   if ( p not in group )
                    then call Procedure Forward_MSU
                    else set SNS = SNS - p
            vi.  if ( SNS = empty set )
                    then return
                    else repeat Step 2.1.iv
                end
        2.2. else begin
            i.   if ( self not in MSU.group ) then return
            ii.  set SNS = empty set
            iii. for each neighbor n of self
                    do begin
                        if ( link (self, n) in ST(SIR) ) then set SNS =
                            SNS U n
                    end
            iv.  get a node p in SNS
            v.   if ( p in group )
                    then call Procedure Forward_MSU
                    else set SNS = SNS - p
            vi.  if ( SNS = empty set )
                    then return
                    else repeat Step 2.2.iv
                end
            end Process_MSU
```

Procedure Correct_MSU simply corrects the time stamp of a neighbor IR for a given multicast group, or forces the IR receiving an MSU to make its time stamp for a given group more recent. Another preferred embodiment of the present invention may handle the validation of MSUs using sequence number and aging mechanisms that are common in link-state routing protocols in the prior art.

The failure of links or IRs has no effect on the dissemination of group membership information in the present invention, because IRs simply announce their own memberships to their neighbors and forward group membership information to their own neighbors only if they determine that some of them may need the information. In contrast, in tree-based multicast routing protocols based on receiver-initiated joining (e.g., CBT and PIM-SM), failure of the core or rendezvous point of the group breaks the multicast tree, and prevents new members from joining, until a new one is elected and made known to all IRs. Furthermore, in mesh-based multicast routing protocols like CAMP, the failure of cores may prompt flooding to survive the failure of all cores.

IV. Multicast Packet Forwarding

The basic packet forwarding scheme in MOST consists of forwarding multicast data packets along the reverse shortest paths from the sources of the packets.

The main control information in a multicast packet is: The address of the intended multicast group, the address of the source of the packet, a sequence number that is used for control functions, and a time to live used to limit the time each packet is allowed to remain in the network.

An IR attached to the source host of a packet simply transmits the packet to its neighbors.

When IR X of IRs 100a-100i receives a multicast packet without errors from neighbor IR Y of IRs 100a-100i, then IR X forwards the packet if the following conditions are satisfied:

1. According to the unicast routing table of IR X, IR Y is the successor (next hop) to the source of the packet.

2. The subtree resulting from excluding IR Y and all IRs and destinations for which Y is the successor contains at least one IR that is a member of the multicast group to which the packet is intended.

The following pseudocode illustrates an exemplary embodiment of how an IR accomplishes this by means of a novel modification of Dijkstra's shortest-path first algorithm made possible by the fact that IRs maintain source trees. The IR executing the procedure simply searches its source tree to try to find the nearest IR that is a member of the target group and is reached in the source tree through a path that does not include the neighbor IR that forwarded the multicast data packet.

```
Procedure Multicast_Forwarding
{called when multicast data packet is received correctly}
URT:            Unicast Routing Table
SIR:            Node identifier of the IR from which multicast
packet is received
SOURCE: Source of the multicast packet
DEST:           Destination group of the multicast packet
URT(X):         Row of the URT specified by X
URT(X).s:       Successor (next hop) to destination X
If ( SIR = URT(SOURCE).s )
        Then call Find_Members(SIR,DEST)
        If (member_found = TRUE) then call
            Send_Packet
End Multicast_Forwarding
Procedure Find_Members(root,group)
{called when IR needs to determine descendants in source tree
for a multicast group}
root:           Root of subtree to be pruned in search
group:          Multicast group of interest in search
ST:             source tree of IR executing procedure
ST.n:           node in ST
self:           node executing procedure
D(self,n):      distance from node self to node n in ST
P(self,n):      path along ST from self to n
l(x,y):         cost of link from x to y
CMF:            closest member first set used in procedure
/* initialize
1. Set member_found = FALSE
2. Set CMF = { self }
3. For each node n in ST
    Do begin
            If ( n is a neighbor of self )
                Then D(self,n) = l(self,n)
                Else D(self,n) = infinity
            If ( root in P(self,n) )
                Then set CMF U n
    End
/* loop searching for the first group member in ST
4. find n not in CMF such that D(self,n) is a minimum
5. if ( n in group )
        then begin
            set member_found = TRUE
            return
        end
```

-continued

```
6. set CMF = CMF U n
7. for each node m adjacent to n and not in CMF
       do begin
   set D(self,m) = Min{ D(self,m), D(self,n) + l(n,m) }
       end
8. if (all nodes in ST are in CMF)
   then return
   else repeat Step 4
End Find_Members
```

Procedure Send_Packet simply processes additional packet header information, such as time to live, to decide whether or not the packet should be transmitted.

Multicast packet forwarding in MOST is much more efficient than in the link-state multicast approaches described in the prior art, such as MOSPF. This is due to the fact that Procedure Find_Members is much faster than the approach used in the link-state multicast approaches in the prior art. First, the search in Procedure Find_Members is executed over a tree topology (the source tree of the IR executing the search), rather than the entire network topology as it is done in the link-state multicast approaches in the prior art. Second, the search implemented in Procedure Find_Members terminates with the first occurrence of an IR being a member of the intended multicast group, rather than having to search exhaustively for all nodes in the topology in order to build a multicast routing tree, as it is done in link-state multicast approaches of the prior art.

Furthermore, in another preferred embodiment of the present invention, an IR can maintain a multicast-forwarding cache (MFC). An entry in the MFC of IR X specifies the address of a multicast group and the address of a source in the multicast group. IR X adds an entry in the cache when it determines that a packet from a given source S and for a given multicast group G should be forwarded because the subtree resulting from excluding IR Y from which the packet was received and all IRs and destinations for which Y is the successor contains at least one IR that is a member of the multicast group to which the packet is intended. Accordingly, IR X can forward a multicast data packet with less processing overhead in the event that the packet corresponds to a source and a group that match an entry in the MFC.

```
Procedure CACHE_Forwarding
{called when multicast data packet is received correctly}
URT:         Unicast Routing Table
SIR:         Node identifier of the IR from which multicast packet
is received
SOURCE: Source of the multicast packet
DEST:        Destination group of the multicast packet
URT(X):      Row of the URT specified by X
URT(X).s:    Successor (next hop) to destination X
MFC:         Multicast forwarding cache
MFC(X,Y):    source X and group Y in MFC
X,Y:         Concatenation of identifiers X and Y
1. if ( SIR = URT(SOURCE).s )
       then if ( SOURCE.DEST = MFC(SOURCE.DEST) ) call
Send_Packet
       else call Find_Members(SIR, DEST)
2. if (members = TRUE)
       then call Send_Packet
End CACHE_Forwarding
```

In one preferred embodiment of the present invention, an IR also maintains a multicast packet-forwarding cache (MPC) to avoid forwarding any multicast data packet more than once. The MPC of IR i maintains an entry for each multicast data packet that it has recently forwarded. The information kept in this data structure is obtained from the headers of the multicast data packets and should be sufficient for the IR to differentiate between any two different multicast data packets. For the case in which multicast IP packets are used in the ad hoc network, such information consists of the source address, destination address (group address), packet identification and fragment offset. The address of the neighbor that relayed that packet is also stored. The main role of the packet-forwarding cache is to avoid packet replication by keeping track of packets already received by the IR. Caching packets is only feasible for low-bandwidth channels and needs to be used only as a precaution when the topology of the ad hoc network is very dynamic and routing tables are very unstable.

Although the invention has been described in the context of particular embodiments, it should be realized that a number of modifications to these teachings may occur to one skilled in the art. Thus while the invention has been particularly shown and described with respect to these particular embodiments thereof, it will be understood that changes in form and scope may be made therein without departing from the scope and spirit of the invention

What is claimed is:

1. A method for communicating multicast group membership information in a network between a plurality of routers in a multicast group, the method comprising:
   reporting routing tree information from each of the plurality of routers reports to other routers of said plurality of routers, wherein the routing tree information comprises a source tree for a unicast routing protocol;
   receiving update information at a second router in the network from a first router, said update information comprising update information on a multicast group and a network address of said first router;
   using said update information to indicate that said first router is becoming a member of said multicast group;
   determining, based at least in part on said update information and the routing tree information reported by said first router, whether said second router is to transmit said update information so that all members of said multicast group remain connected, by determining if said source tree reported by said first router has said second router as a root of a subtree from which said first router is excluded, and if at least one neighbor router of said second router in said subtree is not a member of said multicast group; and
   in response to a positive determination, transmitting said update information from said second router to said at least one neighbor router of said second router.

2. The method of claim 1, further comprising:
   configuring said update information to comprise an identifier of said multicast group.

3. The method of claim 1, further comprising:
   configuring said update information to comprise a network address of said first router.

4. The method of claim 1, wherein said determining further comprises determining if said first router is not a member of said multicast group.

5. The method of claim 4, further comprising:
   configuring said update information to comprise a time stamp, wherein said determining further comprises determining if said time stamp is valid.

6. The method of claim 5, further comprising:
   configuring said time stamp to comprise a first time stamp and wherein said determining if said time stamp is valid comprises determining if said first time stamp is more recent than a second time stamp stored in said second router, wherein said second time stamp is associated with said multicast group and said first router.

7. The, method of claim 1, further comprising:
configuring said update information to comprise an indication that said first router is no longer a member of said multicast group.

8. The method of claim 7, further comprising:
configuring the routing tree information to comprise a source tree for a unicast routing protocol, wherein said determining comprises determining if said source tree reported by said first router has said second router as the root of said subtree from which said first router is excluded, and if at least one neighbor router of said second router in said subtree is a member of said multicast group.

9. The method of claim 8, wherein said determining further comprises determining if said first router is not a member of said multicast group.

10. The method of claim 9, further comprising:
configuring said update information to comprise a time stamp, and wherein said determining further comprises determining if said time stamp is valid.

11. The method of claim 10, further comprising:
configuring said time stamp to comprise a first time stamp, wherein said determining if said time stamp is valid comprises determining if said first time stamp is more recent than a second time stamp stored in said second router, wherein said second time stamp is associated with said multicast group and said first router.

12. A method for forwarding multicast packets in a network comprising a plurality of routers in a multicast group, the method comprising:
reporting routing tree information from each of the plurality of routers to other routers of said plurality of routers;
receiving a multicast packet at a second router from a first router, said multicast packet comprising control information, wherein a multicast packet is from a selected source and for a selected multicast group;
determining, based at least in part on said control information and the routing tree information reported by said first router, if said multicast packet is to be forwarded by said second router, wherein said routing tree information comprises a source tree for a unicast routing protocol; and
in response to a positive determination that said multicast packet is to be forwarded,
forwarding said multicast packet from said second router to at least a third router,
creating an entry in a multicast forwarding cache, wherein said entry indicates that a multicast packet from said selected source and said selected multicast group is to be forwarded from said second router, and
maintaining by said second router a multicast packet-forwarding cache, wherein said multicast packet-forwarding cache comprises an entry indicating each multicast packet recently forwarded by said second router,
wherein said determining comprises determining whether said first router is a next hop in a shortest path from said second router to the source of the multicast packet according to said source tree.

13. The method of claim, 12, further comprising:
configuring said multicast packet to comprise an address of the multicast group.

14. The method of claim 12, further comprising:
configuring said multicast packet to comprise an address of the source of said multicast packet.

15. The method of claim 12, further comprising:
configuring said multicast packet to comprise a time value, wherein said time value is used to limit the time said multicast packet is allowed to remain in the network.

16. A method for forwarding multicast packets in a network comprising a plurality of routers in a multicast group, the method comprising:
reporting routing tree information from each of the plurality of routers to other routers of said plurality of routers;
receiving a multicast packet at a second router from a first router, said multicast packet comprising control information, wherein a multicast packet is from a selected source and for a selected multicast group;
determining, based at least in part on said control information and the routing tree information reported by said first router, if said multicast packet is to be forwarded by said second router; and
in response to a positive determination that said multicast packet is to be forwarded,
forwarding said multicast packet from said second router to at least a third router,
creating an entry in a multicast forwarding cache, wherein said entry indicates that a multicast packet from said selected source and said selected multicast group is to be forwarded from said second router, and
configuring the routing tree information reported by said first router to comprise a source tree for a unicast routing protocol,
wherein said determining comprises determining if said first router is a next hop in a shortest path from said second router to the source of the multicast packet according to said source tree, and if said source tree has said second router in a subtree with at least one router in said subtree being a member of the multicast group.

17. An apparatus, comprising:
a plurality of routers in a multicast group configured to communicate multicast group membership information in a network to other routers of said plurality of routers, wherein each of the plurality of routers reports routing tree information to other routers of said plurality of routers, wherein the routing tree information comprises a source tree for a unicast routing protocol;
a first router; and
a second router,
wherein said first router is configured to receive update information transmitted from said second router and comprises update information on a multicast group and an indication that said second router is becoming a member of said multicast group,
wherein said first router is configured to determine, based at least in part on said update information and the routing tree information reported by said second router, whether said first router is to transmit said update information to at least one neighbor router of said first router, by determining if said source tree reported by said second router has said first router as a root of a subtree from which said second router is excluded, and at least one neighbor router of said first router in said subtree is not a member of said multicast group, so that all members of said multicast group remain connected, and wherein said first router, in response to a positive determination that said first router is to transmit said update information, is configured to transmit said update information to said at least one neighbor router.

18. The apparatus of claim 17, wherein said update information comprises an identifier of said multicast group.

19. The apparatus of claim 17, wherein said update information comprises a network address of said first router.

20. The apparatus of claim 19, wherein said first router is further configured to determine whether said first router is to transmit said update information by determining if said second router is not a member of said multicast group.

21. The apparatus of claim 20, wherein said update information comprises a time stamp, and wherein said first router further determines whether said first router is to transmit said update information by determining if said time stamp is valid.

22. The apparatus of claim 21, wherein said first router is further configured to store a time stamp associated with said multicast group and said second router, wherein said time stamp comprises a first time stamp and wherein said first router is configured to determine whether said time stamp is valid by determining if said first time stamp is more recent than said second time stamp.

23. The apparatus of claim 17, wherein said update information comprises an indication that said second router is no longer a member of said multicast group.

24. The apparatus of claim 23, wherein the routing tree information comprises a source tree for a unicast routing protocol, and wherein said first router is configured to determine whether said first router is to transmit said update information by determining if said source tree reported by said second router has said first router as the root of a subtree from which said second router is excluded, and at least one neighbor router of said first router in said subtree is a member of said multicast group.

25. The apparatus of claim 24, wherein said first router is further configured to determine whether said first router must transmit said update information by determining if said second router is not a member of said multicast group.

26. The apparatus of claim 25, wherein said update information comprises a time stamp, and wherein said first router further determines whether said first router must transmit said update information by determining if said time stamp is valid.

27. The apparatus of claim 26, wherein said first router is further configured to store a time stamp associated with said multicast group and said second router, wherein said time stamp comprises a first time stamp and wherein said first router is configured to determine whether said tire stamp is valid by determining if said first time stamp is more recent than said second time stamp.

28. An apparatus, comprising:
a plurality of routers in a multicast group configured to forward multicast packets in a network, wherein each of the plurality of routers reports control information including routing tree information to other routers of said plurality of routers, wherein said routing tree information comprises a source tree for a unicast routing protocol;
a first router;
a second router; and
a third router, wherein said first router comprises a multicast forwarding cache and is configured to receive a multicast packet from said second router in said network, wherein said multicast packet is from a selected source and for a selected multicast group,
wherein said first router is configured to determine, based at least in part, on said control information and the routing tree information reported by said second router to said first router, if said multicast packet is to be forwarded by said first router and to determine whether said first router is a next hop in a shortest path from said second router to the source of the multicast packet according to said source tree, and
wherein said first router, in response to a positive determination that said multicast packet is to be forwarded, is configured to forward said multicast packet to at least said third router,
wherein said first router is configured to create an entry indicating that a multicast packet from said selected source and said selected multicast group are to be forwarded after making a positive determination that said multicast packet is to be forwarded,
wherein said first router comprises a multicast packet-forwarding cache, and
wherein said multicast packets forwarding cache comprises an entry indicating each multicast packet recently forwarded by said first router.

29. The apparatus of claim 28, wherein said multicast packet comprises an address of the multicast group.

30. The apparatus of claim 28, wherein said multicast packet comprises an address of the source of said multicast packet.

31. The apparatus of claim, 28, wherein said multicast packet comprises a time value, wherein said time value is used to limit the time said multicast packet is allowed to remain in the system.

32. An apparatus, comprising:
a plurality of routers in a multicast group configured to forward multicast packets in a network, wherein each of the plurality of routers reports control information including routing tree information to other routers of said plurality of routers;
a first router;
a second router; and
a third router, wherein said first router comprises a multicast forwarding cache and is configured to receive a multicast packet from said second router in said network, wherein said multicast packet is from a selected source and for a selected multicast group,
wherein said first router is configured to determine, based at least in part, on said control information and the routing tree information reported by said second router to said first router, if said multicast packet is to be forwarded by said first router, and
wherein said first router, in response to a positive determination that said multicast packet is to be forwarded, is configured to forward said multicast packet to at least said third router, and
wherein said first router is configured to create an entry indicating that a multicast packet from said selected source and said selected multicast group are to be forwarded after making a positive determination that said multicast packet is to be forwarded,
wherein the routing tree information reported by said second router comprises a source tree for a unicast routing protocol, and
wherein said first router is further configured to determine if said second router is a next hop in a shortest path from said first router to the source of the multicast packet according to said source tree, and if said source tree has said first router in a subtree with at least one router in said subtree being a member of the multicast group.

* * * * *